US008645326B2

(12) United States Patent
Weizman et al.

(10) Patent No.: US 8,645,326 B2
(45) Date of Patent: Feb. 4, 2014

(54) SYSTEM TO PLAN, EXECUTE, STORE AND QUERY AUTOMATION TESTS

(75) Inventors: Yoram Weizman, Karmiel (IL); Elad Razy, Kiryatshmuel-Haifa (IL)

(73) Assignee: SAP AG, Walldorf (DE)

( * ) Notice: Subject to any disclaimer, the term of this patent is extended or adjusted under 35 U.S.C. 154(b) by 418 days.

(21) Appl. No.: 12/495,542

(22) Filed: Jun. 30, 2009

(65) Prior Publication Data

US 2010/0332535 A1   Dec. 30, 2010

(51) Int. Cl.
*G06F 7/00* (2006.01)
(52) U.S. Cl.
USPC ............ 707/636; 707/804; 709/223; 717/124
(58) Field of Classification Search
None
See application file for complete search history.

(56) References Cited

U.S. PATENT DOCUMENTS

| | | | |
|---|---|---|---|
| 5,557,787 A | 9/1996 | Shin et al. | |
| 6,163,805 A * | 12/2000 | Silva et al. | 709/227 |
| 6,279,008 B1 | 8/2001 | Tung Ng et al. | |
| 6,421,658 B1 | 7/2002 | Carey et al. | |
| 6,754,666 B1 | 6/2004 | Brookler et al. | |
| 6,944,627 B2 | 9/2005 | Zhang et al. | |
| 7,054,877 B2 | 5/2006 | Dettinger et al. | |
| 7,194,479 B1 | 3/2007 | Packham | |
| 7,203,756 B2 * | 4/2007 | Tapperson | 709/227 |
| 7,262,773 B2 | 8/2007 | Couckuyt et al. | |
| 7,337,431 B1 * | 2/2008 | Barnes et al. | 717/124 |
| 7,433,888 B2 | 10/2008 | Hunter et al. | |
| 2002/0039352 A1 * | 4/2002 | El-Fekih et al. | 370/252 |
| 2002/0049738 A1 * | 4/2002 | Epstein | 707/1 |
| 2003/0014510 A1 * | 1/2003 | Avvari et al. | 709/223 |
| 2003/0131085 A1 * | 7/2003 | Zhang et al. | 709/223 |
| 2003/0182308 A1 | 9/2003 | Ernst et al. | |
| 2003/0217069 A1 | 11/2003 | Fagin et al. | |
| 2004/0103103 A1 * | 5/2004 | Kalthoff et al. | 707/100 |
| 2004/0107415 A1 * | 6/2004 | Melamed et al. | 717/124 |
| 2005/0021522 A1 | 1/2005 | Herman et al. | |
| 2005/0102314 A1 | 5/2005 | Howard et al. | |
| 2005/0240558 A1 * | 10/2005 | Gil et al. | 707/1 |
| 2007/0255604 A1 * | 11/2007 | Seelig | 705/7 |
| 2008/0256111 A1 | 10/2008 | Haham | |
| 2009/0144320 A1 | 6/2009 | Weinberg et al. | |
| 2009/0210434 A1 * | 8/2009 | Gordon et al. | 707/100 |

OTHER PUBLICATIONS

U.S. Appl. No. 12/275,934, filed Nov. 21, 2008, 36 pages.
U.S. Appl. No. 12/276,009, filed Nov. 21, 2008, 40 pages.
U.S. Appl. No. 12/275,942, filed Nov. 21, 2008, 44 pages.
U.S. Appl. No. 12/495,519, filed Jun. 30, 2009, 30 pages.

* cited by examiner

*Primary Examiner* — Debbie Le
*Assistant Examiner* — Hasanul Mobin
(74) *Attorney, Agent, or Firm* — Buckley, Maschoff & Talwalkar LLC

(57) ABSTRACT

An automation testing platform that will enable simultaneous testing of new product code over variety of Operating Systems by calling remote machines. In one embodiment, the system is an SAP master data management based system such as NetWeaver, and the testing platform places important testing information onto the master data database itself. The platform then calls and controls the remote machines using distributed computing methodology such as the Java RMI protocol. The system provides the ability to run automated tests according to different technologies, OS, platforms and codelines, and allows for an automatic test portfolio to be managed from a single test catalog. The results can be represented by a variety of configurable user interface reports. The system has an ability to use legacy automation code, and can report on the quality, reliability and stability of the new product code along various configurable key performance indicators.

13 Claims, 11 Drawing Sheets

Figure 9

| Console Hierarchy | | | | | |
|---|---|---|---|---|---|
| MQM_SP0_Yoni | | Tuples | | | |
| Scenarios | | | Repository in TC | | |
| TCs | | | TC in Scenario | | |
| Catalog | | | TC Interface | | |
| Codelines | | | TC User Input Value | | |
| Component | | | Virtual Variations | | |
| GTP Type | | | Virtual Variations_Chain Part | | |
| Hosts Types | | | Virtual Configurations Object | | |
| Hosts Types Categories | | | | | |
| Intension | | | | | |
| Interface Parameter types | | Tables | | | |
| MDM_Repository | | Name | Type | Display Fields | Unique Fields |
| OSS Messages | | Scenarios | Main | Key; Owner | |
| Package | | TCs | Main | Key | Key; Java Class |
| Projects | | Catalog | Flat | Catalog | |
| Rep. Load Type | | Codelines | Flat | Name | |
| Rep. Status | | Component | Flat | Component | |
| Risk | | Deliverables | Flat | Name, ID | |
| TC Mapping Inner Keys | | GTP Type | Flat | GTP Type | |
| TestCases_Groups | | Hosts Types | Flat | Type | |
| Users | | Hosts Types Categories | Flat | Value | |
| Group | | Intension | Flat | Intension | |
| MDM_Versions | | Interface Parameter Types | Flat | Type | |
| Test_Classification | | MDM_Repository | Flat | Rep. Name | |
| Categories | | OSS Messages | Flat | Message Number | |
| Images | | Package | Flat | Package | |
| Image Variants | | Projects | Flat | Project | |
| Sounds | | Rep. Load Type | Flat | Name | |
| Videos | | Rep. Status | Flat | Name | |
| Binary Objects | | Risk | Flat | Risk | |
| Text Blocks | | TC Mapping Inner Keys | Flat | Key | |
| Copy Blocks | | TestCases_Groups | Flat | Group | |
| Text HTMLs | | Users | Flat | IUser | |
| PDFs | | Group | Hierarchy | Gropu | |
| Masks | | MDM_Versions | Hierarchy | MDM Version | |
| Relationships | | Test_Classification | Hierarchy | Category | |
| Workflows | | Categories | Taxonomy | Name | |
| Named Searches | | | | | |

| Table Detail | |
|---|---|
| Name | Scenarios |
| Code | |
| Description | |
| Type | Main |
| Display Fields | key; Owner |
| Unique Fields | |
| Key Mapping | No |
| Hide Table | No |

SYSTEM TO PLAN, EXECUTE, STORE AND QUERY AUTOMATION TESTS

BACKGROUND OF THE INVENTION

1. Field of the Invention

One or more embodiments of the disclosure's system and method are related to the field of automated software testing, particularly as applied to computerized enterprise management systems based upon master data management methodology. More particularly, but not by way of limitation, one or more embodiments of the disclosure's system and method enable a system to plan, execute, store and query automatic tests.

2. Description of the Related Art

Master Data Management Methods:

Large corporations and other large organizations are often highly complex entities, frequently carrying out a variety of different business and organizational processes from different departments or divisions (e.g. sales, marketing, customer service, finance, human relations, material purchasing, operations, and the like). These various departments and divisions are often separated by large distances, and often staffed by individuals with very different skill sets, and often served by different computer systems. As computerized methods of managing organizations have developed, a problem that has frequently occurred is that the same customer, same part, or same supplier will often be referred to by different departments under different names and identification. For example, consider a situation where shipping sends a package of inventory number "ABC" to "Bill Smith" at "121 First St. in Chicago, Ill.", and saves it in a shipping computer database. Two weeks later, a man named "William Smith" from "121 $1^{st}$ street from Chicago Ill." calls customer service with a complaint about his "defective television," and this is registered in the customer service computer database. It may be very difficult for a centralized computer system, polling the shipping and customer service databases, to reconcile the two sets of entries. These difficulties can result in lost efficiency and organizational dysfunction, with potentially severe consequences.

As a result of these problems, the concept of "Master Data Management (MDM)," developed by SAP AG, and other organizations, has become popular. The Master Data Management concept is that every persistent (i.e. persisting for a period of time greater than a single transaction, and often persisting for appreciable periods of time such as months or years) unit of interest, be it a customer, vendor, part, process or other entity, should have its own unique "master" identification that is uniform throughout the organization. Such Master Data Management (MDM) based computer systems are discussed in Kalthoff et. al., U.S. Pat. No. 7,236,973, the contents of which are incorporated herein by reference.

To generate master data, data from different databases must be matched up, redundant or inaccurate records cleansed, and overlapping and valid records be given a common identification and format. The resulting cleaned-up and curated "master data" is then stored in an MDM database.

This MDM database can then be made available to the various computer enterprise management systems that run on various computer "clients" or "hosts" throughout the organization. Thus, for example, a first host running "shipping database" type business logic software in the shipping department client or host computer can use the MDM database entry for William Smith to indicate that the shipping transaction for television unit ABC has been shipped. A second computer client or host running "customer complaint" business logic software in the customer compliant department can consult the MDM database, and correctly determine that the "William Smith" that was previously shipped television unit "ABC" is now wishing to enter in a complaint about that particular unit.

The MDM "master record" concept is simple, but extremely powerful. As an example of how it can facilitate business efficiency, consider a third host computer in the quality assurance department, running software with "manufacturing defects tracking" business logic. A quality assurance expert can, thanks to the MDM "master data" database, examine data from computer hosts one and two, and see that "William Smith" complained about the "ABC" television unit exactly two weeks after the ABC television unit was shipped.

The quality assurance expert can then run queries on his third host computer, examine the history of customer complaints regarding the "ABC" television unit, and see a similar pattern of failures occurring about two weeks after shipment. Here the quality assistance expert may be further assisted by additional reports presentation software, running on the third host, which drills through the data, and presents the data to the expert via a suitable graphical user interface (GUI). For example, the reports software running on the third host might draw histograms showing that these complaint problems cropped up with the "ABC" unit starting a month earlier, and that many "ABC" television units are breaking about two weeks after shipment. The expert might in turn wonder what happened to the production of 'ABC" television units a month ago.

Here the quality expert might interrogate a fourth host computer, tied to the operations department that runs "manufacturing materials" and "vendor" business logic. If these databases in turn use the same "master data" concept to enable their data to be easily compared across the organization, then the problem can be easily solved. The quality expert can use the same "ABC" television identification records to access the manufacturing materials database on the fourth host, automatically identify the affected lots, and run a query to determine the vendors that provided the materials for the defective lots. This might find, for example, that all the bad lots correlate with a switch in a capacitor vendor from company "X" to company "Y", and the quality inspector can quickly take corrective action. By contrast, if the different departments did not use records that were reconciled versus a curated "master record", this simple process would be slow and difficult, and organizational efficiency would suffer.

As a result, organizations that use MDM master data methods tend to have a large competitive advantage, and such methods have now become widespread. In addition to the previous examples, MDM "master record" databases are often used to store business partner data, customer data, employee data, material data, product data, vendor data and other types of data as well.

Software Testing Methods:

The business logic and report generating software used by the computers running modern corporations and other large enterprises are in an almost constant state of flux. This is because the underlying business processes may be altered on an almost continual basis due to technological developments, changes in government regulations, consultant advice, continuous process improvement, unexpected bottlenecks, corporate mergers, upsizing, downsizing, and the like. Such changes in business processes in turn often require that reports being generated for reading by users, often through graphical user interfaces, must also change. As a result, although potentially any aspect of enterprise computer system software may be subject to change, changes in business logic and reporting-presentation software modules are particularly frequent and such changes are often implemented by changes in the underlying code for these software modules or programs.

As a result, in modern enterprise management computer systems, new software and other support files are being almost continuously generated, often on a daily or weekly basis. Such new software is notoriously prone to unexpected bugs and idiosyncrasies. A change in code in one software module can remain undetected under most data input and output scenarios, but then unexpectedly cause problems when, for one type of extreme data set, the new code interacts with code from a different software module in an unexpected way, causing undesirable results. Thus improved methods for rapid software testing are highly useful. In particular, methods that facilitate automated software testing, particularly on systems that rely upon MDM database methods, are of great practical and commercial interest.

BRIEF SUMMARY OF THE INVENTION

One or more embodiments of the disclosure's system and method are related to automation testing platforms that can enable simultaneous testing of new product code, over a variety of different Operating Systems, by calling remote host machines that utilize MDM database methods. An unusual aspect of the disclosure's system and method is that it utilizes the MDM master database itself to help store certain testing parameters and scenarios. A second aspect of the disclosure's system and method is that it utilizes distributed computing methods to call and operate the remote host machines.

In one embodiment, the automated testing platform system is running on an SAP MDM system, such as an SAP NetWeaver™ system, and this testing platform calls various remote host machines using the Java RMI distributed computing protocol. The disclosure's system and method can run automated tests on MDM-aware hosts according to different technologies, OS, platforms and codelines, and allows for an automatic test portfolio to be managed from a single catalog. The test results can be represented by a variety of configurable user interface reports. The disclosure's system and method is particularly useful because by using the MDM master database to help store test parameters, and by using distributed computing methods, high use of legacy automation code is possible. This extensive use of legacy code helps both lower testing costs, and helps improve testing realism. The disclosure's system and method can also report on the quality, reliability and stability of the new product code along various configurable key performance indicators.

In one embodiment, the disclosure's system and method may be used to test various versions of product code that has been pre-loaded on various remote host machines, according to various test scenarios and testing parameters controlled by a centralized testing administrator. In another embodiment, the disclosure's system and method may also be used to speculatively test new code modules (e.g. "new software"), without the necessity of pre-loading the new code modules on the various remote host machines, by forcing the host machines to run most of the old code ("old software") on the host machines, but then speculatively execute the new code on a test machine. This way the new code can be realistically tested without the necessity of actually loading it on the host machines, and errors can be caught at an early stage.

BRIEF DESCRIPTION OF THE DRAWINGS

The above and other aspects, features and advantages of the disclosure's system and method will be more apparent from the following more particular description thereof, presented in conjunction with the following drawings wherein:

FIG. 9 shows a screenshot of the appearance of the test parameter metadata that is stored in the MDM database.

DETAILED DESCRIPTION

Figure 1:
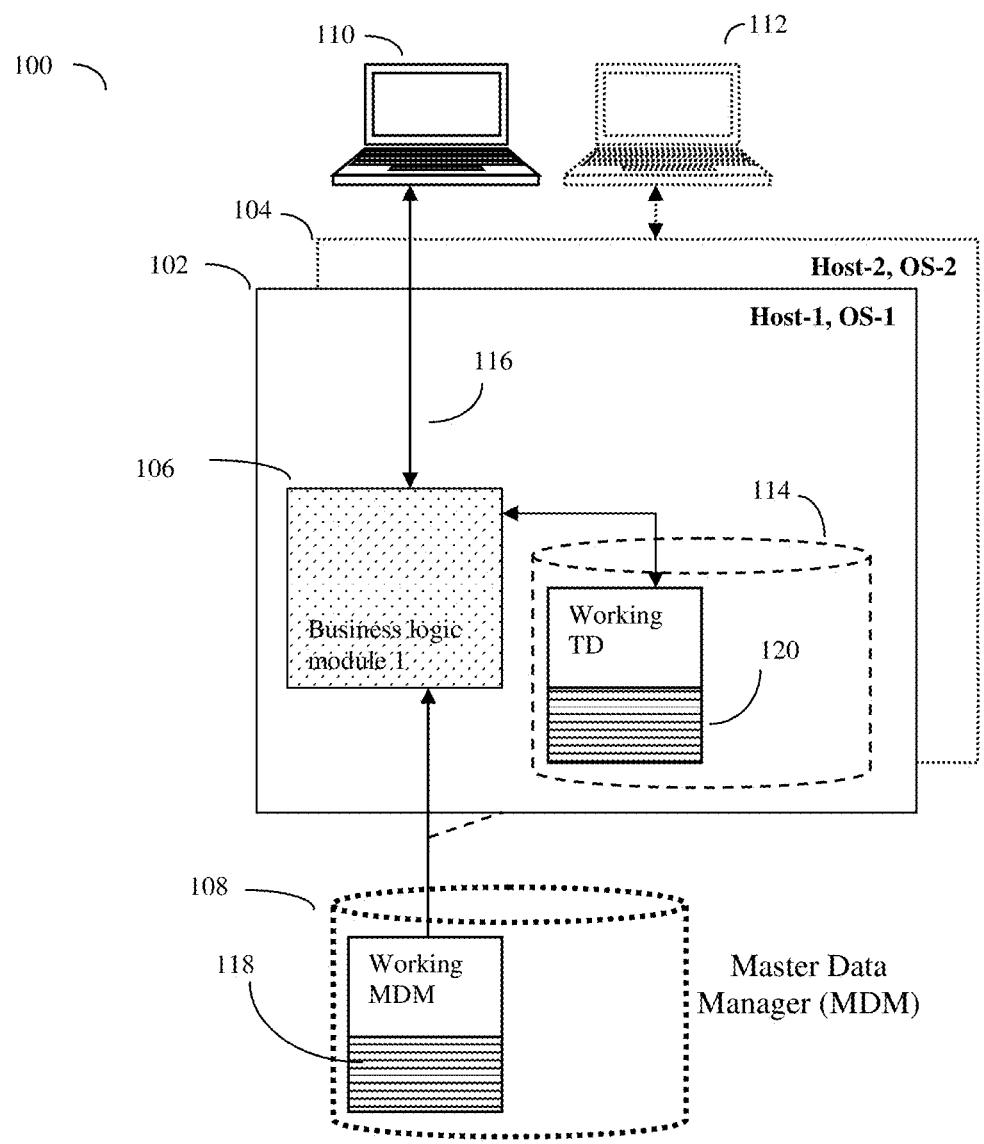
FIG. 1 shows a "production" enterprise management system, such as an SAP system. Here one or more computer clients or "hosts", each running different business logic (e.g. accounting, materials management, HR, etc) draw upon a common master data record in order uniformly process all records across an organization. These hosts store their specific transactional data in local transactional databases, and each host may be connected to one or more user interfaces.

A system to plan, execute, store and query automatic tests will now be described. In the following exemplary description numerous specific details are set forth in order to provide a more thorough understanding of embodiments of the invention. It will be apparent, however, to an artisan of ordinary skill that the present disclosure system and method may be practiced without incorporating all aspects of the specific details described herein. In other instances, specific features, quantities, or measurements well known to those of ordinary skill in the art have not been described in detail so as not to obscure the invention. Readers should note that although examples of the disclosure's system and method are set forth herein, the claims, and the full scope of any equivalents, are what define the metes and bounds of the invention.

Definitions:

Test Case: Atomic (i.e. single) software validation or function test

Scenario: Group of test cases with a common business meaning

Job: Scenario instance on Run time. In addition to the scenario object—the job information also has the software version and addresses (IP) of the various computer systems (hosts) where the test cases and scenarios will be run.

Run: An execution defined group of Jobs. These can run automatically (for example by an automated scheduler) or on demand.

Catalog: Alternate term for a defined testing schedule, which may be composed of test cases, scenarios, jobs, runs, and other testing parameters.

Queue Manager: A method (often implemented as a Java software routine running on the central test system) that manages the job queue according the relevant: 1) test cases, 2) deliverable files (e.g. the software objects or modules that are to be tested), and 3) the available computer system (host) platform where that particular test will be run.

MQM: An abbreviation for Master data Quality Manager—a shorthand way of describing the invention's master data based software quality management system.

MDM system: A computer system that uses master data management methods to integrate data obtained from multiple different sources.

Review of distributed computing interfaces: Java RMI, CORBA, and related methods.

This disclosure makes use of distributed computing concepts, and here a brief review of distributed computing is in order.

In general, distributed computing methods allow programs to be divided into different modules, parts or objects, and these different modules, parts, or objects can be run at the same time on multiple computers that interact through a network. One of the more popular ways to do this is by use of client-server architecture, wherein a program part or module running on one computer, called the "client" contacts another computer, called the "server". A first client program module will usually contact the server, and pass a first set of data to a second program module running on the "server", and request a second set of data back from this second program module. Data from the first client program module can also be saved by the server as needed. Although alternative methods, such as 3-tier architecture, N-tier architecture, tightly clustered computers, peer-to-peer networking, and virtualization methods may also be used, throughout this disclosure, all specific examples will be given based upon the easy to visualize client-server architecture, however this is not intended to limit the scope of the invention.

With respect to general client-server based distributed computing methods, two specific methods are particularly popular. These are the Java Remote Invocation mechanism, usually abbreviated as "RMI" or "Java RMI", and the Common Object Request Broker Architecture method, usually abbreviated as "CORBA". Here, for simplicity, and again without intending to limit the scope of the invention, all specific examples will be given based upon the popular Java RMI protocol and method.

The Java RMI distributed computing method is used by the Java language. Java, originally developed by James Gosling at Sun Corporation, is very popular because Java applications can be run on Java Virtual Machines (JVM), which in turn are supported by most operating systems and computer processors. Thus a Java application, once developed, can be (often after a compiling process) run on a wide variety of different processors and operating systems with minimal or no modification. In other words, Java applications are an example of a "system independent programming language" or portable.

Java RMI methods work by means of a registry, usually located on the distributed computing network, where the different software objects are described and indexed. A Java RMI server for a software object can make the software object available for distributed computing applications by first identifying the object in a network based registry. A remote Java RMI client desiring to use the software object can then discover the remote software client object identification in the registry.

The process works by instructing the client about the possible existence of the remote software object when the client Java program is coded, and instructing the server that it should potentially make it's copy of the software object available for distributed computing use when the server Java program is coded. When the client Java program is compiled, the compiler will place a "stub" file on the client that contains the interface information needed for the client to properly invoke the remote client. Similarly, when the server Java program is compiled, the compiler will place a "skeleton" file on the server that can read data transmitted by the client stub, and in turn interface with the software object that is located on the server. Communication between the stub and the server then takes place through the network aided by suitable remote reference layer (RLL) of software. In practice, the net result is that a client, although not having the actual copy of the software object present, can call up (through the network) the software object residing and running on the remote server, and interact with it as if the software object was running on the client machine.

Distributed computing can be performed using a wide variety of different network hardware, different network topologies, and different networking protocols. As a few examples, these can include such hardware methods as Ethernet, Optical Fiber, and Wireless methods; various topologies such as bus networks, mesh networks, ring networks, star networks, and tree networks, and various protocols such as the popular Transmission Control Protocol (TCP), and many other types of various web services protocols (e.g. Simple Object Access Protocol (SOAP), and other protocols such as ASAP, SAML, Translation WS TC, WS-MetadataExchange, WS-Notification, WS-Policy, WS-Reliable Messaging, WS-RF, WSRP, WS-Security Services TC, etc.). Networks can either be local and relatively private, such as local area networks (LAN), broader, or indeed worldwide, such as the Internet. Typically when non-private networks, such as the Internet are used, often it will be desirable to protect the various distributed computing computers from intrusion or attack by viruses by use of firewalls or other methods that permit authorized communications to proceed while blocking unauthorized access. If such firewall methods are employed, use of distributed computing networking methods, such as the previously discussed Java RMI or CORBA methods, which can overcome even highly stringency firewalls using methods such as HTTP tunneling, can be advantageous.

Review of the SAP NetWeaver System.

In modern enterprise management systems, typically many different computer hosts, often running different business logic software, and often in different parts of the world, communicate using the Internet as a network. Due to the use of the Internet, and the MDM approach of ensuring or "weaving" data consistency across these many diverse hosts, SAP offers an Internet capable, MDM master database capable, system called the "NetWeaver" platform, and other companies in turn sell their respective systems under different brand names. Of course use of the Internet per se is not strictly necessary, and the NetWeaver platform Web Application Server can be viewed more generally as a network application server that just happens to use the Internet.

The current version of SAP NetWeaver is version 7.1, and this version has been used for some of the specific embodiments of the invention. The SAP NetWeaver platform integrates various processes including the SAP Master Data Management (MDM) system, and other processes including an Web Application Server, Business Intelligence, Composition Environment, Enterprise Portal, Mobile platform, and a Process Integration Platform. These function together using the SAP Web Application Server (WAS) or (WebAS) as the runtime environment. This discussion will primarily focus on the Master Data Management (MDM) and the application server aspects of the SAP NetWeaver WAS system.

These SAP systems run various types of programs, such as business logic programs, report programs, and the like. These programs are often written in Java, or in the SAP Advanced Business Application Programming (ABAP) programming language. These programs can include class pools that act to contain class interfaces at a global level, function pools that contain predefined function libraries normally used by many different SAP programs, interface pools that serve to hold interfaces at a global level, online programs that define various user and program interaction sequences, report programs that allow users to drill down into data and view it in a convenient way, subroutine pools that hold various useful subroutines, and type pools that define data types and structures.

Due to the need for software verification, typical SAP web application server systems at present often contain three different systems. These three systems are: 1) a system for development, 2) a system for testing and quality assurance, and 3) a system for actual production. Of course it is system 3 that makes the entire concept worthwhile from a business perspective, and systems 1 and 2 are simply the overhead required to make system 3 work.

Some of the advantages of the disclosure's system and method are higher test accuracy (i.e. more realistic testing scenarios, more likely to uncover subtle problems, and lower development costs due to the high use of legacy software. In some cases, various business tested processes can be created by combining atomic test cases, and these can then be used to construct highly realistic business scenarios, resulting in a high degree of testing realism. However as will be discussed, there are other advantages as well. In one embodiment, the disclosure's system and method may also be used to reduce the overall cost of operating SAP and similar systems. This is because the disclosure's system and method makes it easier to outsource more of the testing and quality assurance "system 2" to an outside organization that specializes in testing and quality assurance. Further discussion of the SAP NetWeaver system may be found in U.S. application Ser. No. 11/313,975, the contents of which are incorporated herein by reference.

Non-Intuitive Aspects of the Invention.

Certain aspects of the disclosure's system and method require a departure from conventional approaches, and here this departure is described in more detail. As previously discussed, the master data MDM method and MDM database approach, by providing a common identification for all items and processes of business interest, has been extremely successful at allowing complex organizations to coordinate their many complex computer databases across multiple functional areas. The MDM database is thus somewhat "sacred", in that conventional wisdom would dictate against using it for non-organizational (i.e. non-business) use. The conventional wisdom is that using the MDM master data for other purposes would be a bit like writing a shopping list on a rare and valuable manuscript. It simply would not be considered.

However if this prejudice against appropriating the MDM database and system for non-business and organizational use can be dropped, a number of advantages, particularly with regards to improved software testing realism and flexibility, can be realized. These advantages are:

1: If the testing used actual organizational master data, the results of the various testing scenarios would be difficult to predict, and thus malfunctioning applications would be harder to detect.

2: If test data was supplied to the applications using an alternative approach from a different type of test database, the test results would be less realistic. That is, the alternative test database by necessity would have to be accessed by different "testing" software paths, resulting in testing software pathways that are substantially different from "real" software pathways, and less accurate testing.

3: An organization typically runs its business applications on many different host computers (hosts), and these hosts often run under different operating systems. The logistics of customizing each different host and each different OS to take test data from a specialized test database are formidable. By contrast, each host running under each different OS can already read master data from the MDM database. Thus using the MDM database in a non-traditional manner to distribute test data and testing scenarios is both more realistic, and also cuts development time and expense.

Thus a key aspect of the disclosure's system and method is a realization that by going against conventional wisdom, and using the MDM master data database and system for purposes of storing information related to software testing, testing metadata, test cases, scenarios, and related information, the state of the art in software testing for this type of system can be considerably advanced.

The use of the MDM master data to facilitate testing can be further facilitated by standardizing the approach. For example, standardized testing "headers" or "footers" files could be appended to MDM master data on a routine basis. These standardized testing MDM files could be ideally designed to facilitate routine automated testing, for example by including scenarios for the most frequent validation tests, and these standardized MDM test files can be supplemented by test specific data as needed.

Example

Implementation on SAP NetWeaver WAS 7.1

In one embodiment, the disclosure's system and method was implemented as software code running on an SAP NetWeaver Web Application Server (WAS) version 7.1. The hardware was an SAP system devoted for testing and quality assurance, i.e. a "system 2" according to the previous definition. In this configuration, there is a central SAP NetWeaver WAS 7.1, communicating to various host computer systems (hosts) through a restricted network (such as the Internet & protected firewalls, or a network designed to simulate the Internet and protective firewalls), that does not allow unrestricted communication between the various hosts and the central SAP NetWeaver WAS system. Instead, only restricted communication, such as communication through Java RMI protocols is allowed. This configuration helps simulate the constraints encountered in a normal SAP NetWeaver production environment.

The software code of the disclosure's system and method tests various SAP applications running on different host computers (hosts), and understands how the various SAP applications should ideally perform. The disclosure's system and method retrieves the test results, and analyzes the results to determine if the various applications are running correctly.

As previously discussed, one unusual and non-intuitive aspect of the disclosure's system and method is that the disclosure's system and method makes use of the SAP MDM database and application software to assist in this testing. As previously discussed, the MDM system normally holds all of the organization's metadata (e.g. the curated and reconciled organization master database). In this embodiment, SAP NetWeaver WAS 7.1 implements the MDM system in the form of a server connected to the MDM database.

In the SAP embodiment, the MDM system exposes its master database and other services through an Application programming interface (API) through an SAP web services protocol through a web application that connects with the MDM system. For greater testing realism (e.g. to make the test code correspond as closely as possible to the real-life production environment, as well as to use as much real-life production code as possible), the testing tests all of the various application interfaces through the MDM system in a manner similar to how the applications would normally interact with this system.

To do this, as previously discussed, the MDM system and master data database is used in a non-standard way. Instead of just storing the usual organizational master data and metadata in the MDM, the disclosure's system and method also uses the same basic MDM data structure and applications to store and retrieve at least some reference information that is only intended for testing purposes.

For greater test accuracy, the tests should be run in a manner that loads software test scenarios that simulate the high frequency of transactions and interactions that occur in the course of a normal production system. The tests should also simulate the fact that a normal production system typically will be run on multiple hosts, and each host may be running on a different operating system.

For example, the central accounting department of an organization may run its application on an accounting host running a Windows OS, while a first American entry department of the organization may run its applications on an American order processing host running an AIX OS, a second European order entry department of the organization may run its applications on an European order processing host running a Linux OS, and the new code desired to be tested and validated may be an ABAP or Java application intended to run on all systems to reconcile both order processing departments with the accounting department.

In this example, the various hosts are all synchronized (i.e. all use the same identification for the same customers and same items) by communicating with an MDM master data database, for example, an MDM controlled by the SAP NetWeaver WAS version 7.1 system. To speed up transactions, in some cases it may be desirable for the local hosts to maintain a cache or local copy of the MDM master data, and periodically update this data from the central MDM database. In other cases, the local hosts may not use a local cache or copy of the MDM, but instead retrieve MDM master data directly from the WAS over the Internet using a suitable web services protocol.

In this implementation, it is desirable to implement the various test scenarios in the form of a queue, preferably executing the new software or code to be tested in a business sequence that simulates normal business transactions, as well as abnormal (i.e. high demand, strange situation) business transactions where code problems may be lurking. Ideally such scenarios will stress the new software by taking it to an edge, beyond what the business would normally do.

Normally, these test scenarios will be designed to simulate business interactions that have had a history of causing problems. Portions of the software with a history or other factors associated with weakness can be tested more heavily as desired. Dependencies, that is system interactions where a bug or problem in one area can impact a different area can also be entered into the test scenario and examined. Typically, a thorough catalog of different test scenarios will execute thousands or more tests each time it is run. These test results can be stored in a dedicated test database, which can also include the file names of the new software code or files to be tested, and the details of the various test scenarios, and can be later analyzed by various methods in order to generate a high level report of the testing results, suitable for consumption by a human tester.

When run in a "system 2" testing environment, this configuration may also be set up to reproduce historical software configurations—that is software configurations not actually present in the current actual production environment. We term this mode "on demand execution". For example, for unresolved software bugs that may or may not have been resolved by later versions of code, hosts run in a testing environment may be reloaded with an earlier or alternate software configuration, and the problems of that time or that configuration rerun with various testing scenarios to better understand the unresolved bugs, and hopefully generate insight needed to prevent such problems from occurring in the future.

In another embodiment, the disclosure's system and method provides an automation platform that runs all automation tests, collects the results, and displays the results separately or collaboratively time it is run. The system will enable audits, such as queries regarding various runs, and can provide an option to search for the results by either success or failure (backward aggregation), date or version of tests, and MDM master data database used. As before, the system stores relevant test parameters on the MDM system. The system can utilize commercially available presentation and report software, such as SAP iViews, DBViews, Crystal Reports or other similar reporting software to simplify interpretation of the test data. Because the test system utilizes the MDM to hold important test setup data, the disclosure's system and method allows the function of many MDM system aspects, such as the MDM transport, MDIS function, and MDSS functions in a realistic production environment.

As previously discussed, the disclosure's system and method provides an ability to configure and schedule various test scenarios, each test scenario again being constructed from a bundle of atomic test cases. Often it will be convenient to configure the system so that an internal message will be generated for every verified failure, as well as after manual confirmation. The system will normally be configured to enable parallel-executions, and execute tests on all platforms, in accordance with version availability. It is also useful to configure the system to execute the scenarios in "Verification" mode where each test is verified using different layers (similar to the DBViews approach).

In another embodiment, the system can execute scenarios on remote hosts by using applications such as the Hewlett Packard QuickTest Professional Software (HP QTP) system. This software, produced and distributed by Hewlett Packard, supports functional and regression test automation using keyword driven testing. Here testers can capture flows from application screens (i.e. the host or client graphical user interface (GUI)). Specifically, the system can execute QTP tests and test both client GUI and backend applications. Alternatively other GUI testing programs with similar functionality can be used.

As previously discussed, the system can also execute scenarios defined from various atomic test cases on multiple hosts, simulating a business process. That is, business processes involving transactions from multiple departments or sites within an organization can be simulated with a high degree of realism, allowing for more complete software debugging and validation.

In another embodiment, the disclosure's system and method consists of a storage layer, again usually based on the Master Data Management (MDM) system, as well as a Database Management System DBMS) storage to hold the results. The system will use a logic layer (which may be based upon J2EE running on an application server (such as the previously discussed SAP Web Application Server (WAS)), the previously discussed platform machines (hosts) where the tests are run, and again various methods to interpret the data. As previously discussed, these data interpretation methods may be based upon data visualization software schemes such as SAP portal iViews, or other methods.

As before, the disclosure's system and method works by arranging the various test scenarios in a prioritized queue according to both the availability of the host machines, and the installable available software test files containing the software to be tested. Each test scenario is defined as a job to be run by the WAS server, and the relevant host machines upon which the test scenario is to be run are assigned. At every defined interval, the system calculates the status of the queued elements, and the application polls the relevant scenarios to be multi-threaded executed. Relevant assigned host machines are supplied. The system then executes the jobs on the remote machine, often using the Java RMI paradigm, which enables testing the code on various OS, platform and technologies. When the job is finished, the results are stored in the DB and the machines are assigned to next job in the queue.

As before, although the Java RMI methods are used throughout as a specific example, equivalent type distributed computing methods, preferably based on system independent languages, may also be used.

Specific Examples

FIG. 1 shows the host side of a "production" SAP NetWeaver WAS system (100), here operating in a stand-alone manner as if it was temporarily detached from the NetWeaver WAS component that helps create and synchronize the MDM master data records. Here one or more hosts (102, 104), each running different business logic (106) (e.g. accounting, materials management, HR, etc) draw upon common master data MDM records from a MDM database (108) in order to uniformly process all records across an organization. This MDM database may be either a local copy of relevant portions from a central MDM database stored elsewhere (such as on a SAP NetWeaver WAS system), or alternatively the information may be supplied via a network connection to such a central MDM database (not shown).

These hosts (102), (104) are typically computer systems containing at least one computer processor, often one or more X86 processors, Power Processors, or the like, with memory, input and output devices, software, network connections, and connections to various user interfaces (110, 112), which themselves may be desktop computers, laptop computers, or handheld portable computers or cell phones. In some embodiments, the hosts may be virtual hosts implemented by another computer system. The hosts store their specific transactional data (120) in local transactional databases (114), often implemented as persistent memory storage in hard drives or non-volatile memory.

The different hosts (102, 104) may be based upon different processor types, and may also run under different operating systems (OS), often a Windows, AIX, Linux, UNIX or other type OS. In some embodiments, each host may have local storage for its transactional data (114), and in other cases, the transactional data may be stored remotely, and potentially transactional storage from multiple hosts may be stored on the same device (114). In this diagram, a transaction, for example an entry that a customer has just purchased a particular product, is entered by a customer service agent into a user interface (110), and this information is communicated to the host business logic software (106) by a wired or wireless network (116) of any sort. The host business logic (106) will typically use the working master record information (118) in the MDM database (108) to insure that this transaction is being stored in a manner that the rest of the organization can understand and retrieve. The business logic (106) will also typically store a copy of the actual transaction information (e.g. that the customer identified in the MDM (118) bought "three widgets") in the working transactional database memory (120), often in the local transactional database (114). This local transactional database can then be polled and read by other hosts or centralized data management systems as needed, and the results reconciled with the rest of the organization using the MDM system (108, 118).

Thus for all configurations, transactions from different hosts (102, 104) running different types of business logic (106) can be easily reconciled because the hosts all use the same master data item identification to store their various transactions.

Figure 2:
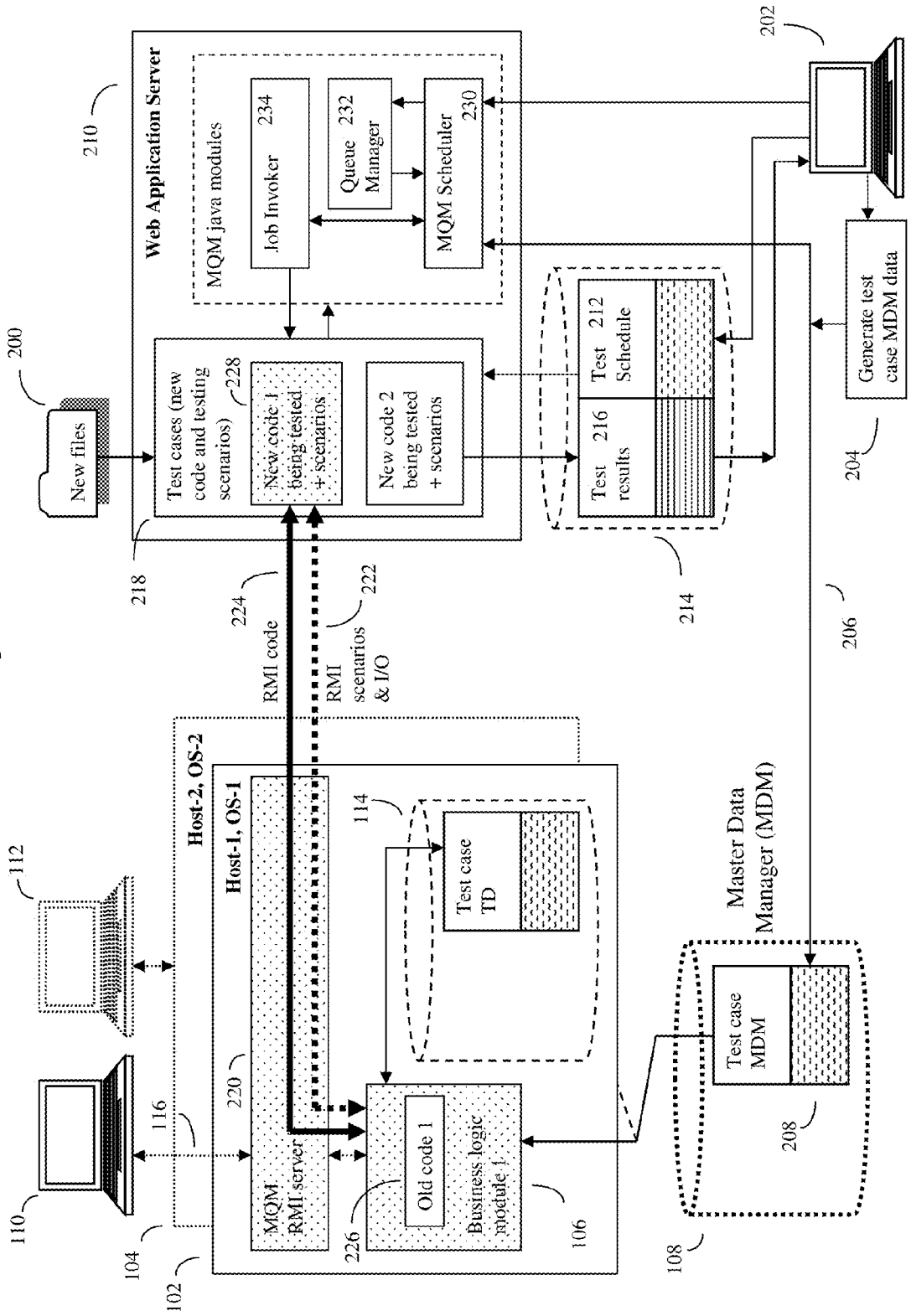
FIG. 2 shows the disclosure's system and method being used to debug code or other computer processes "in house", as well test the code's proper operation under a variety of testing provided inputs and outputs. Here new code or other files is submitted (top right). The tester uses a user interface (right bottom) to generate test master records and test metadata, which are transferred to the in-house master data manager. The tester also generates test scenarios and assigns them to the relevant test cases. The Web application server takes the new code, and uses RMI to force the hosts to ignore their local user interfaces, and optionally ignore a portion of the old business logic code, and instead take commands from the web server, and optionally also substitute the new code 1 on the web server in place of the old code 1. RMI is also used to transmit the results (output) back to the Web application server, where the test results are stored in a database, and can be viewed by the tester in a user interface.

FIG. 2 shows the disclosure's system and method being used to debug code "in house", here in an SAP NetWeaver Web Application Server installation configured for testing and quality assurance ("system 2"). Here new code or other files for testing (200) is submitted to the device that is controlling the testing, which in this example is a web application server (210), such as a SAP NetWeaver WAS. It should be understood that the SAP NetWeaver WAS is itself a computer system, containing one or more processors, an operating system, and its own software. Thus (210) is in essence a computer system not unlike that of the hosts, but running different software, and connected to different peripherals.

For in-house testing on dedicated testing and quality assurance systems ("system 2"), the software configuration of the various hosts (102), (104) is under tight control by the testers, and the hosts may be loaded with any version of software and business logic (106) that the tester desires. For example, the tester can load any new code directly to the hosts, or load historical versions of old code as needed to trace the root cause of older problems. Of course on production systems, this degree of tester control over the host software is not so easily available, and the invention's alternate means of testing new code can be useful.

Usually the tester or entity that is setting up the testing uses a testing user interface (202) (which again can be a desktop or laptop computer in its own right), or other means, to enter in the data needed for testing purposes. This testing data can include testing master data records (204) (for example for fictitious customers or items, as well as various fictitious transactions, scenarios, and other instructions needed for testing purposes). Those instructions and data that will later be needed by the hosts for testing purposes can be transmitted to the hosts (206) via a network or other means. Here the data is put into the master data database controlled by the Master Data Manager, and those portions as needed by the hosts are transmitted to the local copy of the MDM used by the hosts (108), where it will be accessible to the hosts as "test case MDM data" (208). Alternatively, as previously discussed, the MDM (108) can be remote from the hosts (and in fact be the same MDM used by the Web Application Server (210) (for example an SAP NetWeaver WAS), and the hosts can access the test case MDM data (208) directly by a network (206). Alternatively, this data can be physically transported to the host master data database (108), (208) by portable storage media such as a DVD disk, portable hard disk, or other means.

The tester (202) also generates test scenarios for use by the test controller device (210) (again usually a WAS) and these scenarios may also be stored in the MDM (108) (208) database as needed. Some of this information, such as the test scenarios and test schedules (212) may also be stored in a "results" database (214) that will later also be used to store the test results (216).

The test device (210) (here the WAS) takes the new code or new testing files (200), and uses a distributed computing interface, such as the previously described Java RMI method, to control the host computers (102, 104). For example, the control device (210) can be set up as a distributed computing client such as an RMI client (218), the hosts (102, 104) can be set up as distributed computing servers such as RMI servers (220), and the machines can communicate over a network using the RMI protocol (222) to control all hosts being tested (102, 104). That is the Java RMI client can control the operation of the plurality of hosts. Optionally, these RMI methods can also be used to force the hosts to run at least portions of some candidate new host code or new software (228), such as a replacement for old module (226) of old business logic code (old software) (106) remotely on test device (210). Here the host system might still run most of the old software business logic (106), but here old software module (226) is bypassed, and a new software module (228) from (200) on machine (210) is run in its place. This optional embodiment can be useful way of doing software testing and validation using actual production systems, because the software running on the actual production system need not be altered during the testing process. In still other embodiments, the WAS RMI can be set up as the server, and the various host RMI can be set up as the client.

For example, the test device (210) may command the hosts (102, 104) to ignore the network (116) input from input devices (110), and instead direct input and output through the RMI channel (222) and run various scenarios as dictated by the testing schedule. The test device (210) may optionally also command the hosts to stop using old code module (226), and instead remotely execute functions originally intended for old code module (226) to one or more new code modules (new files from (200)) redirected by RMI server (220), where each new code module will be associated with its particular type of testing scenarios (228).

The hosts (102, 104) can take test data, such as fictitious test case master data (208) and other information as needed from their MDM (108). The hosts will often use their local transactional databases (114) to perform various testing scenarios. At each operation, as desired, the RMI link (222) and or (224) is used to transmit the results (output) back to the test device (210). There the test results (216) can be stored in a test database (214). The results can then be processed as desired, usually by using various types of analysis and report generation software, and then viewed by the user in interface (202) or other suitable interface.

FIG. 2 also gives an overview of some of the various steps and software operations that take place in the test control device (210) while the debugging operation is running. These operations may be written as, for example, Java programs and modules running under the control of one or more computer processors in system (210). As one example, a scheduler program module (230) may determine the schedule in which various test cases and scenarios should be run. The scheduler module will typically wake up every run cycle, and collect the jobs that are to be run. This program may in turn interact with a Queue manager module (232) that further refines the test schedule depending upon system availability and other factors. The Queue manager will typically run an algorithm to allocate the needed hosts according to the running jobs and the relevant host types. Finally a Job Invoker module (234) will send various test scenarios for actual execution, and help control this test execution. In particular the Job Invoker will remotely invoke the test cases sequence for each job. At a finer level of detail, this process also involves other steps. In particular cross processing, where the data is encapsulated according to the needed interfaces, and where the serial jobs are transformed into multithreaded running jobs, and this is also performed by test device (210).

Other tests that can be run using this method include host (client side) tests such as checks of the performance of the host graphical user interface(s). This can be done using software methods such as the previously described HP QTP software.

In principle, nearly every networked host platform capable of running a Java Virtual Machine (JVM), and that also relies upon master data, may be tested by these methods.

Figure 3:
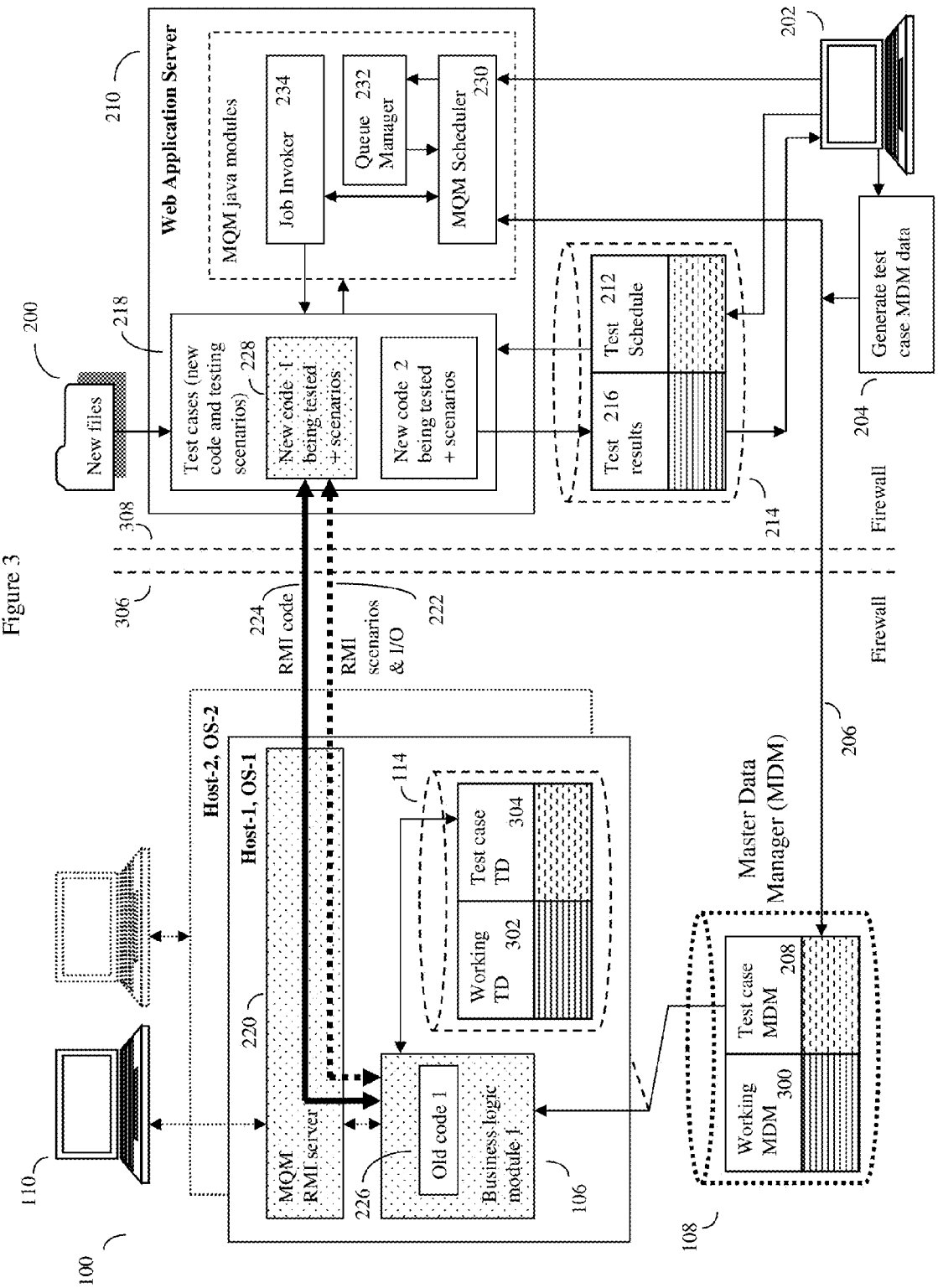
FIG. 3 shows a version of the disclosure's system and method being used on a routine basis to remotely debug a production (actual client) system from a different organization. Here the master data manager MDM has both real working client data on it, as well as selected test case MDM data. The client transactional database also is divided into a working portion with real data, and a transactional portion with test case data. Here, the ability of RMI to send data across one or more firewalls is used to, for example, allow SAP or some other testing company different from the client company to test the client system out during times of low-use, such as night.

FIG. 3 shows a version of the disclosure's system and method being used on a routine basis by a testing service organization to remotely debug a production host system (100) that is run by a client organization from a remote location. Here the master data manager MDM (108) may have both real working client MDM data on it (300), as well as selected test case MDM data (208) from the service organization. In this situation, various types of partitioning or protection methods to guard against inadvertent overwriting or alteration of client MDM data will often be useful.

The client transactional database (114) is also divided into a working portion with real client transactional data (302), and a transactional portion (304) holding test case data.

In this example, where the testing device (210) and the production system (100) are often separated by a distance and are connected by a low security network, such as the Internet, often firewalls (306, 308) are used to protect against intrusion and data destruction from viruses. Here, use of protocols such as the Java RMI protocol (222, 224) can be particularly useful, because this protocol can be used to transmit data across multiple firewalls. Indeed, by using methods such as HTTP tunneling, even extremely high security firewalls can usually be overcome.

In this application, a client company wishing to reduce costs by, for example, subcontracting out the testing and validation function to an outside dedicated testing and validation group could arrange for suitable backups of their MDS data, and then could allow the outside group limited access to their system (100), particularly during times of low use, such as at night or on weekends or holidays.

FIGS. 4-10 give more details of one specific embodiment of the invention, again running on an SAP NetWeaver WAS 7.1 system.

Figure 4:
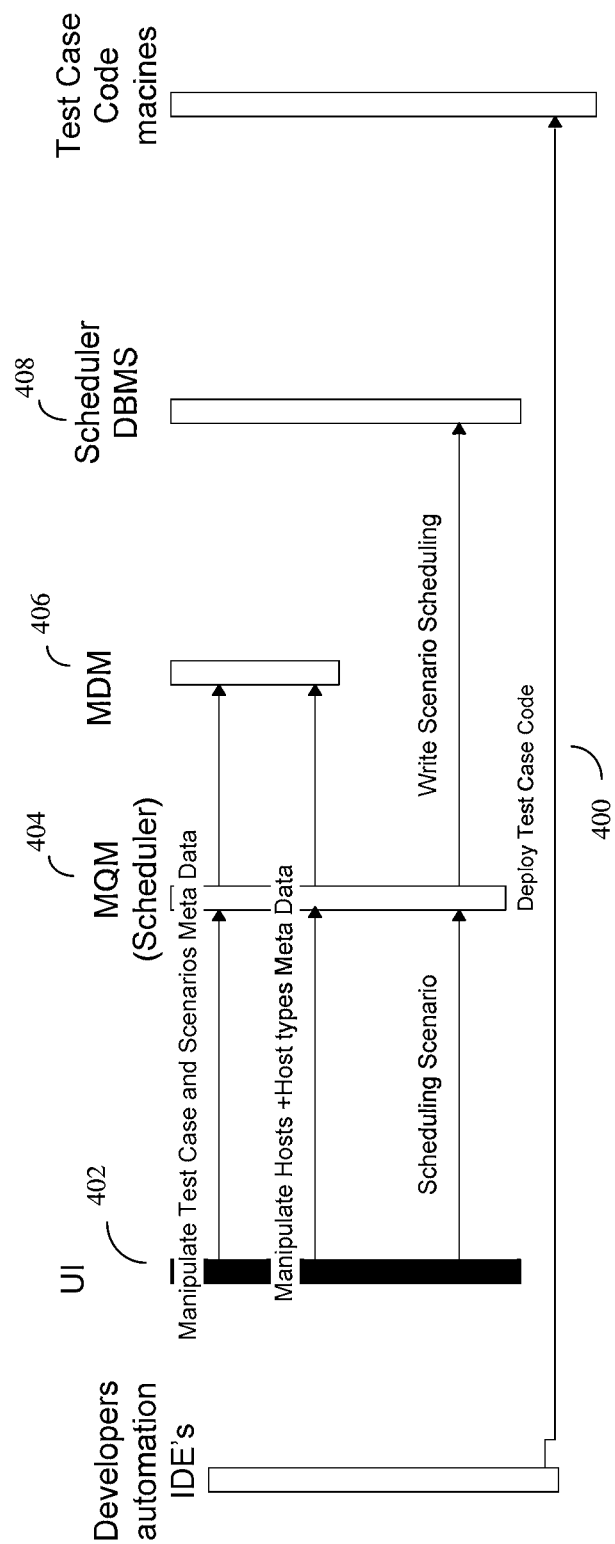
FIG. 4 shows a detail some of the activities that may take place during the design phase of the automated software test system.

FIG. 4 shows further detail of some of the steps that may take place during the design of the various software testing methods. Typically either the original software developers, testing experts, or automated design equipment will first develop and deploy the test case code (400). Then, usually in a user interface (402) (202), the testing experts will construct various test cases and scenarios, and develop the metadata needed to implement these test cases and scenarios. These are stored and then transmitted to the MQM scheduler (404) (230). The testing experts will also determine how the various hosts should be tested, and what sort of metadata (such as what types of fictitious testing MDM records, I/O, software interactions, etc.) should be used for this testing, and this will also be first deployed to the MQM scheduler (404) (230), and then usually to the MDM (406) (108) storage system as needed. Finally the testing experts will develop various test scheduling scenarios, and this will be transmitted to the scheduler database management system (408) (214). Typically the test cases code is then deployed using the Java RMI methods (224, 222).

Figure 5:
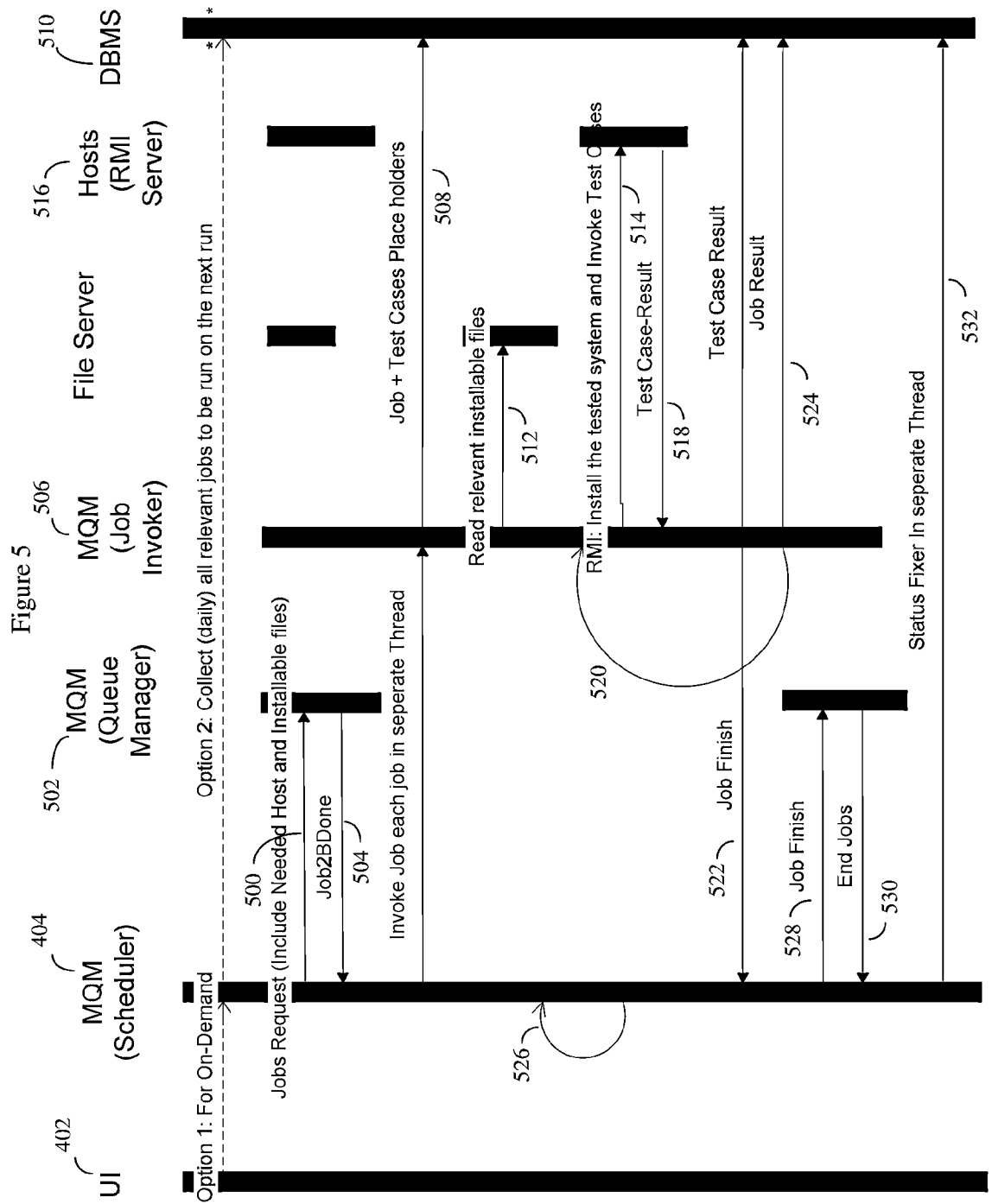
FIG. 5 shows a detail of some of the activities that may take place while the automated software test system is running.

FIG. 5 shows a further detail of some of the steps that may take place during the actual execution (run time) of the code testing invention. Here the tester may schedule the run through a user interface (402) (202) or alternatively, the MQM scheduler (404) (230) can begin the run. The MQM scheduler (404) (230) will take the job request (500) and coordinate which specific jobs are to be run with the aid of the MQM Queue manager (502) (232). The Queue manager (502) (232) will then report back the specific job to be done (504) to the MQM scheduler (404) (230), and the Scheduler in turn will transmit instructions the MQM job invoker (506) (234) to send the Job and test case place holder information (508) to the results database manager system (510) (214). The MQM job invoker (506) (234) will then read the relevant software files to be tested (512) (200) from an appropriate file server, and then, using the RMI methodology, remotely run (514) the testing files or relevant new code (200) on the hosts (516) (102, 104), and the hosts will report back various test case results (518) repeating through various test cases (520) and again storing results on the results database manager system (510) (214). When this particular job is finished (522), the result of the test case runs are stored on the database manager (510) (214), and the Job invoker (234) will also report that this particular job is finished to the MQM scheduler (404) (230). That job result is also communicated to the database manager system (524) (214). This process can repeat as many times with different jobs, files and scenarios as necessary (526). When the last part of a job is finished, the MQM Scheduler (404) (230) reports this (528) to the MQM queue manager (502) (232), and the Queue manager (502) (232) gives permission (530) for the MQM scheduler (404) (230) to terminate the test run. The MQM scheduler (404) (230) than updates the database manager system (510) (214) with the results that the jobs have completed, and updates the status of the run (532).

Figure 6:
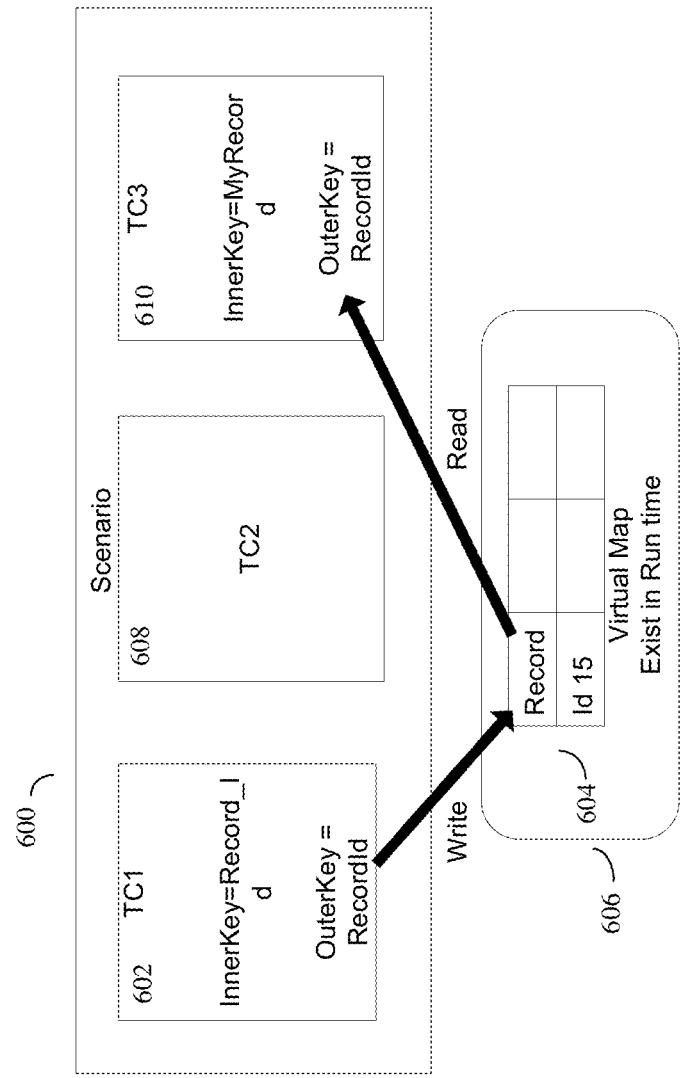
FIG. 6 shows a detail of how the test transaction cases can preserve data during the software test job execution.

FIG. 6 shows some of the activity that takes place inside a host system (102, 104) during a test run. Here in the test scenario (600), a first test case, test case 1 (602), is instructed to write a record (604) into the host local transactional database (606) (114). A second test case, TC2 (608) is then implemented on the host, and does not interact with record (604). A third test case, TC3 (610) is then invoked (by device (210)) that reads the record (604) from the transactional database (606) (114) previously written by test case TC1 (602). If everything is working correctly, the TC3 results will be as predicted. If not, a software error in either TC1, TC2, or TC3 can be presumed. Here each test case is an "atomic test case", and the combination of several "atomic" test cases gives a simple business record read-write scenario.

Figure 7:
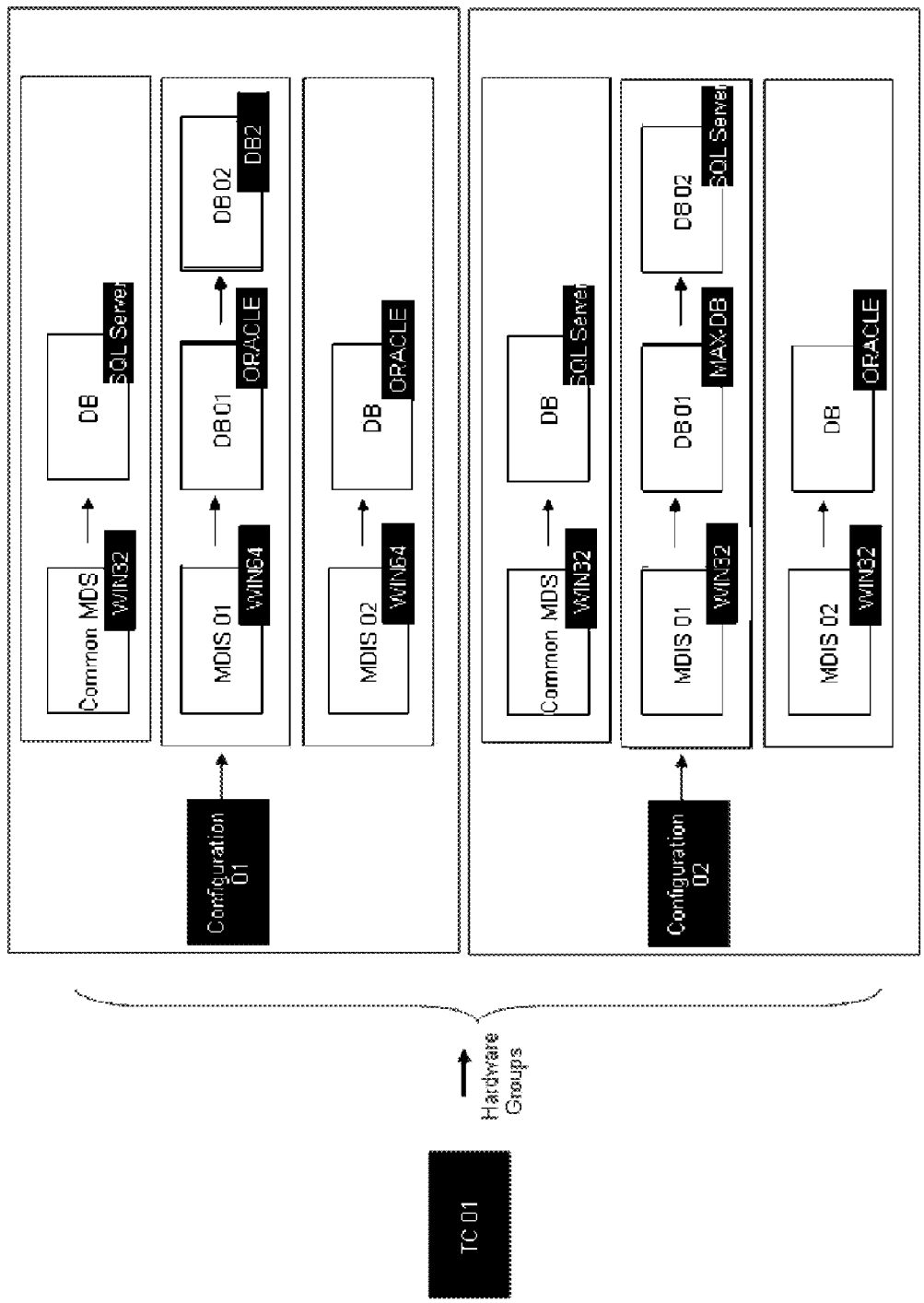
FIG. 7 shows how the test cases can be run on several different sets (configurations) of computer hardware groups, which may be running different operating systems.

FIG. 7: FIG. 7 shows that many aspects of an MDM system may be tested by the same test cases. Here the function of the MDS and MDIS modules, running on different hosts and different operating systems, is also being tested. On an SAP system, the "MDS" server typically manages the MDM databases that contain the master data, where it is used to help manage, store, and update master data. The MDIS (also called the MDM import server) allows the system to automatically import data (such as Excel files, SQL files, text files, XML files and the like in conjunction with predetermined assignment maps, and curate (i.e. clean, restructure, and normalize the data) so that it is of high enough quality to be used for master data. Here the functions of these important modules are also being tested on a variety of different hardware and OS platforms using the same test case. As long as the different hardware groups have the same basic schema, the same test case can be used.

Figure 8:
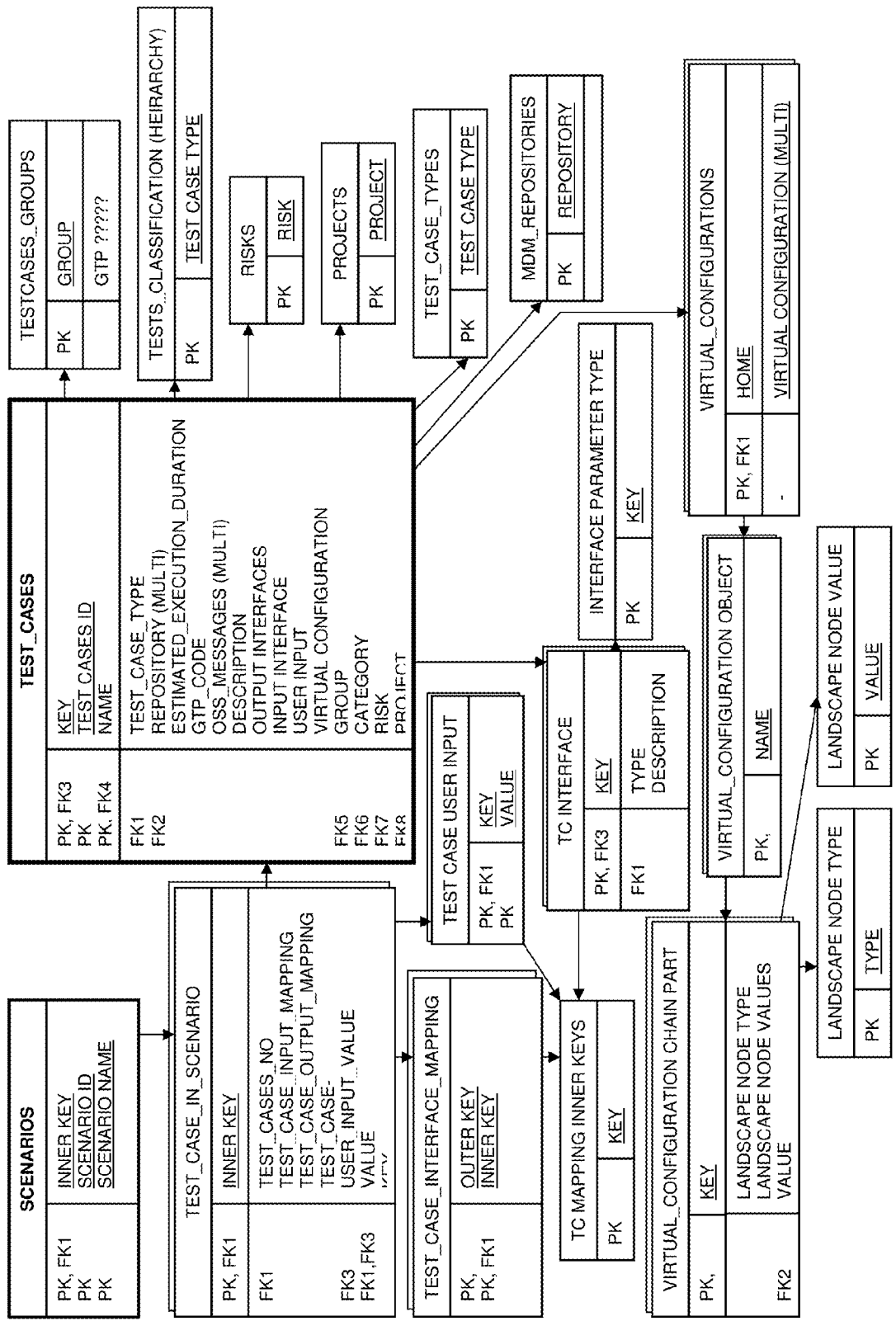
FIG. 8 shows how test parameters may be stored within the MDM database.

FIG. 8 shows an entity relationship diagram example of the data structures that can be used to store various test scenarios and test cases in the MDM master data database (108). The main tables are indicated in the darker bordered boxes, and the tables that have multiple instances (tuples) are indicated by double boxes.

FIG. 9 shows a screen shot of the directory of test metadata that is stored in an MDM (208), again helping to show the entity relationship between these various types of metadata.

Figure 10:
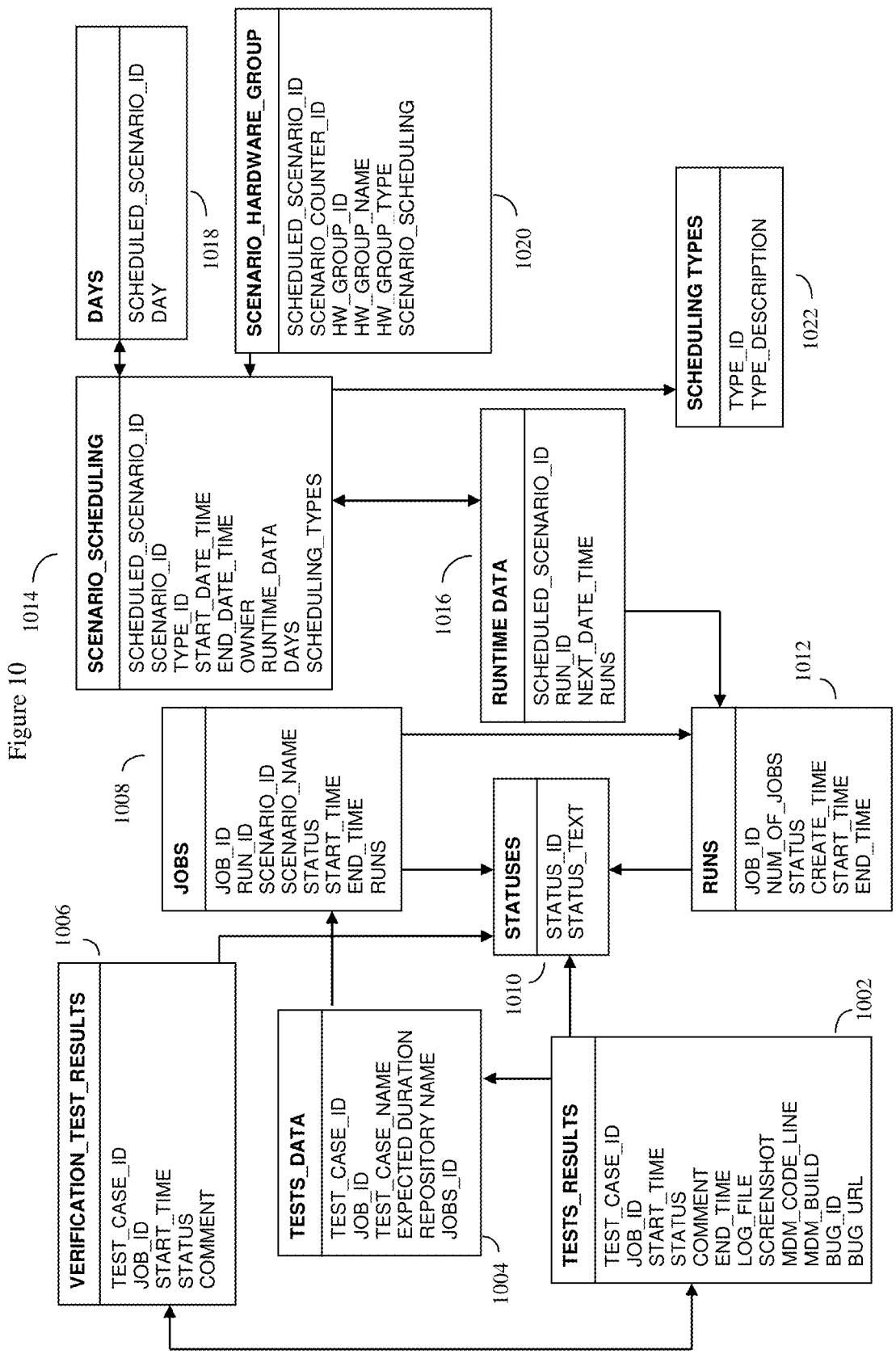
FIG. 10 shows how the test results and test scheduling can be stored in the database management system. These results will usually be processed and presented to the user by a graphical user interface (GUI).

FIG. 10 shows an example of the entity relationship diagram and data structures that can be used to store various test results (216) as well as test schedules (215) on the test result database (214). In reality, this test result data is usually analyzed and transformed by suitable report generation software, and presented to the user in a more readable form, usually through a graphical user interface (GUI). As can be seen, the test result database contains much useful information, including not only the actual test results (1002), but also information needed to put these result in context, such as the test data (1004), verification results (1006), jobs that were run (1008), the status of the runs (1010), the run identification (1012), scenario scheduling (1014), runtime data (1016), days that the testing was done (1018), the hardware that the scenarios were run on (1020), and the types of scheduling used (1022).

Figure 11:
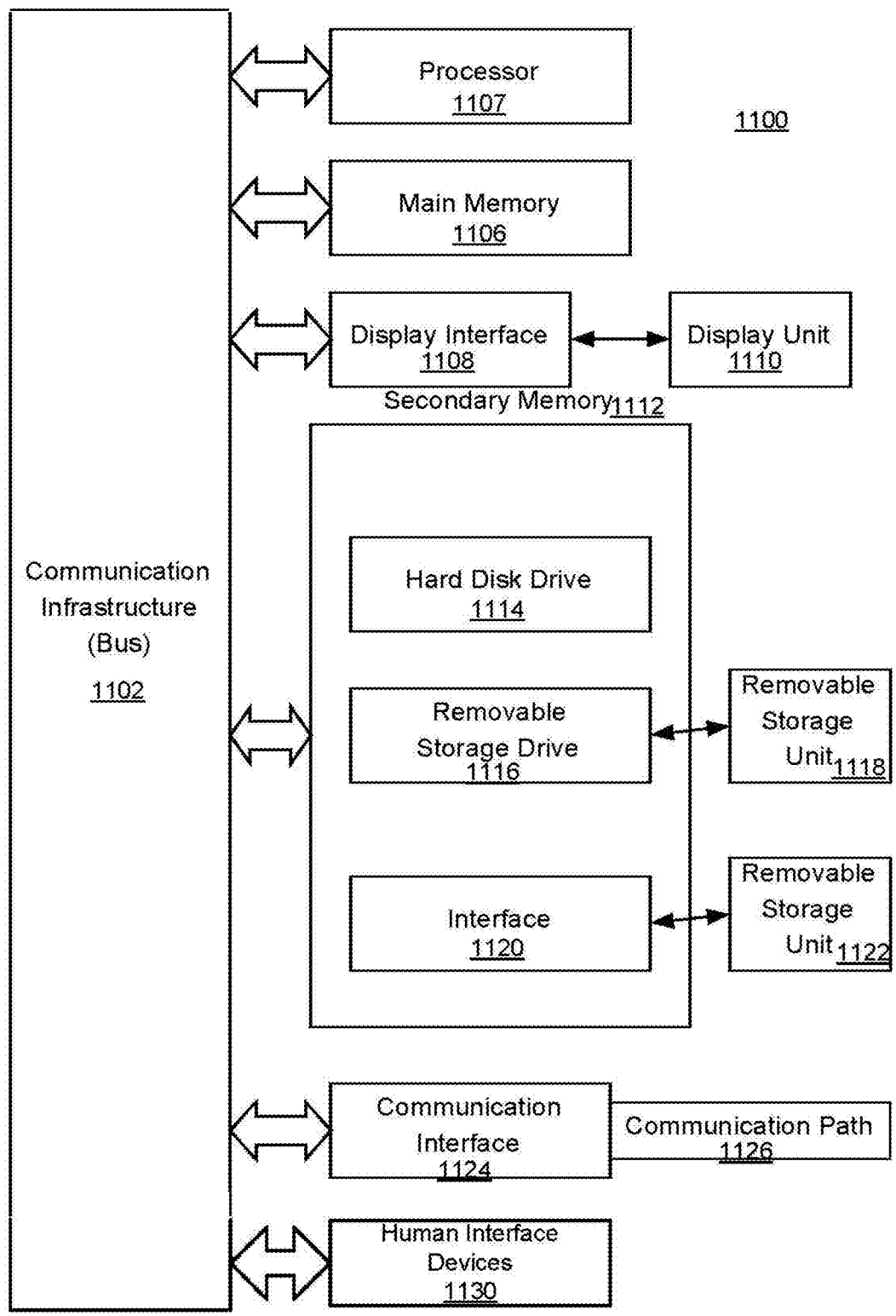
FIG. 11 shows a general purpose computer suitable for implementing one or more methods, apparatus, and/or systems of the disclosure.

FIG. 11 is provided for purposes of illustrating a general-purpose computer (1100) and peripherals which, when programmed as described herein, may operate as a specially programmed computer capable of implementing one or more methods, apparatus and/or systems of the disclosure. Processor (1107) may be coupled to a bi-directional communication infrastructure such as Communication Infrastructure System Bus (1102). Communication Infrastructure (1102) may generally be a system bus that provides an interface to the other components in the general-purpose computer system such as Processor (1107), Main Memory (1106), Display Interface (1108), Secondary Memory (1112) and/or Communication Interface (1124).

Main memory (1106) may provide a computer readable medium for accessing and executed stored data and applications. Display Interface (1108) may communicate with Display Unit (1110) that may be utilized to display outputs to the user of the specially-programmed computer system. Display Unit (1110) may comprise one or more monitors that may visually depict aspects of the computer program to the user. Main Memory (1106) and Display Interface (1108) may be coupled to Communication Infrastructure (1102), which may serve as the interface point to Secondary Memory (1112) and Communication Interface (1124). Secondary Memory (1112) may provide additional memory resources beyond main Memory (1106), and may generally function as a storage location for computer programs to be executed by Processor (1107). Either fixed or removable computer-readable media may serve as Secondary Memory (1112). Secondary Memory (1112) may comprise, for example, Hard Disk (1114) and Removable Storage Drive (1116) that may have an associated Removable Storage Unit (1118). There may be multiple sources of Secondary Memory (1112) and systems of the disclosure may be configured as needed to support the data storage requirements of the user and the methods described herein. Secondary Memory (1112) may also comprise Interface (1120) that serves as an interface point to additional storage such as Removable Storage Unit (1122). Numerous types of data storage devices may serve as repositories for data utilized by the specially programmed computer system of the invention. For example, magnetic, optical or magnetic-optical storage systems, or any other available mass storage technology that provides a repository for digital information may be used.

Communication Interface (1124) may be coupled to Communication Infrastructure (1102) and may serve as a conduit for data destined for or received from Communication Path (1126). A Network Interface Card (NIC) is an example of the type of device that once coupled to Communication Infrastructure (1102) may provide a mechanism for transporting data to Communication Path (1126). Computer networks such Local Area Networks (LAN), Wide Area Networks (WAN), Wireless networks, optical networks, distributed networks, the Internet or any combination thereof are some examples of the type of communication paths that may be utilized by the specially program computer system of the invention. Communication Path (1126) may comprise any type of telecommunication network or interconnection fabric that can transport data to and from Communication Interface (1124).

To facilitate user interaction with the specially programmed computer system of the invention, one or more Human Interface Devices (HID) (1130) may be provided. Some examples of HIDs that enable users to input commands or data to the specially programmed computer of the disclosure's system and method may comprise a keyboard, mouse, touch screen devices, microphones or other audio interface devices, motion sensors or the like, as well as any other device able to accept any kind of human input and in turn communicate that input to Processor (1107) to trigger one or more responses from the specially programmed computer of the disclosure's system and method are within the scope of the system of the invention.

While FIG. 11 depicts a physical device, the scope of the system of the disclosure may also encompass a virtual device, virtual machine or simulator embodied in one or more computer programs executing on a computer or computer system and acting or providing a computer system environment compatible with the methods and processes of the invention. Where a virtual machine, process, device or otherwise performs substantially similarly to that of a physical computer system of the invention, such a virtual platform will also fall within the scope of a system of the invention, notwithstanding the description herein of a physical system such as that in FIG. 11.

One or more embodiments of the disclosure's system and method are configured to enable the specially programmed computer of the disclosure's system and method to take the input data given and transform it into a source-independent server interface by applying one or more of the methods and/or processes of the disclosure's system and method as described herein. Thus the methods described herein are able to transform the raw input data, such as digital commands, to a source-independent server interface accepting origin-specific commands, using the system of the disclosure to result in an the server performing origin-specific commands arranged to preserve the independence of the using the specially programmed computer as described herein. Particularly, the system of the disclosure may be programmed to acquire an object containing commands for execution and interpreting said commands in light of an origin-independent interface.

While the disclosure's system and method herein disclosed has been described by means of specific embodiments and applications thereof, numerous modifications and variations could be made thereto by those skilled in the art without departing from the scope of the disclosure's system and method set forth in the claims.

What is claimed is:

1. A method for testing software comprising:
configuring at least one host with a Java RMI server, wherein said host is associated with a business enterprise and exchanges real business data with a master data management database in connection with operation of the business enterprise via an application programming interface that interfaces with the master data management database, the master data management database comprising a unique identification for each persistent unit of interest throughout the business enterprise, and wherein the master data management database comprises both fictitious test case master data and real master data;

loading software test scenarios onto a web application server connected to a network, said web application server equipped to function as a Java RMI client, wherein at least one software test scenario includes a first atomic test case that writes a record to a virtual map that exists at runtime and a second atomic test case that reads the record from the virtual map;

generating the fictitious test case master data and loading it onto the master data management database along with the real business data via the application programming interface that interfaces with the master data management database; using said Java RMI server and said Java RMI client to control operation of said at least one host from said web application server, generating test results according to said test scenarios, wherein at least one test result represents a value associated with the record read by the second atomic test case;

and transmitting said test results to said web application server.

2. The method of claim 1 wherein said at least one host and said at least one web application server are configured to communicate over said network across at least one firewall.

3. The method of claim 1 wherein said web application server is used to control content of said master data management database.

4. The method of claim 1 wherein said at least one host comprises a plurality of hosts, at least one of said plurality of hosts run under control of different operating systems, and said Java RMI server and said Java RMI client control said operation of said plurality of hosts using a system independent programming language.

5. The method of claim 1 wherein said test results are stored in a test result database connected to said web application server, and wherein at least some of said test results are transformed for viewing on a graphical user interface (GUI).

6. The method of claim 1, wherein said method additionally uses software configured to capture flows from application screens from graphical user interfaces connected to said at least one host.

7. A method for testing software comprising:
configuring a first host running a first operating system and a second host running a second operating system with a distributed computing server, wherein each host is associated with a business enterprise and exchanges real business data with a master data management database in connection with operation of the business enterprise via an application programming interface that interfaces with the master data management database, the master data management database comprising a unique identification for each persistent unit of interest throughout the business enterprise, and wherein the master data management database comprises both fictitious test case master data and real master data;
loading software test scenarios onto a network application server connected to a network, said network application server equipped to function as a distributed computing client, wherein the software test scenarios are loaded in accordance with a test schedule and an algorithm that allocates the hosts according to running jobs and relevant host types;
generating the fictitious test case master data and loading it onto the master data management database along with the real business data via the application programming interface that interfaces with the master data management database;
using said distributed computing server and said distributed computing client to control operation of said first host and second host from said network application server;
generating test results according to said test scenarios;
forcing the first host of said first host and second host to execute at least one aspect of old software residing on said at least one host and remotely execute at least one aspect of new software residing on said network application server; and
transmitting said test results to said network application server.

8. The method of claim 7 wherein said networks application server is a web application server, and said at least one host and said at least one web application server are configured to communicate over said network across at least one firewall.

9. The method of claim 7 wherein said network application server is used to control content of said master data management database.

10. The method of claim 7 wherein said at least one host comprises a plurality of hosts, at least one of said plurality of hosts run under control of different operating systems, and said distributed computing server and said distributed computing client control operation of said plurality of hosts using a system independent programming language.

11. The method of claim 7 wherein said test results are stored in a test result database connected to said network application server, and wherein at least some of said test results are transformed for viewing on a graphical user interface (GUI).

12. The method of claim 7, wherein said method additionally uses software configured to capture flows from application screens from graphical user interfaces connected to said at least one host.

13. The method of claim 7, wherein said master data management database is associated with a MDM system that uses master data management methods to integrate data obtained from multiple different sources.

* * * * *